United States Patent [19]

Bessey

[11] Patent Number: 5,791,809

[45] Date of Patent: Aug. 11, 1998

[54] DRAGLINE WITH IMPROVED PIN-RETAINING STRUCTURE

[75] Inventor: Jay C. Bessey, Greenfield, Wis.

[73] Assignee: Harnischfeger Technologies, Inc., Wilmington, Del.

[21] Appl. No.: 842,072

[22] Filed: Apr. 24, 1997

[51] Int. Cl.⁶ .................................................. B25G 3/00
[52] U.S. Cl. ........................... 403/348; 403/157; 403/315; 403/317
[58] Field of Search .......................... 403/157, 161, 403/162, 163, 315, 316, 317, 79, 97, 348, 349, 350, 376

[56] References Cited

U.S. PATENT DOCUMENTS

| 2,743,895 | 5/1956 | Tygh ........................... 403/79 X |
| 2,967,726 | 1/1961 | Weston ........................ 403/157 |
| 3,606,406 | 9/1971 | Walters ....................... 287/20 |
| 3,954,344 | 5/1976 | Nakama ...................... 403/348 X |
| 4,102,124 | 7/1978 | Swager ....................... 403/157 X |
| 4,337,614 | 7/1982 | Briscoe ....................... 59/84 |
| 4,400,856 | 8/1983 | Tseng ......................... 403/348 X |
| 4,532,622 | 7/1985 | Newbold ..................... 403/348 X |
| 5,577,858 | 11/1996 | Kasim et al. ................. 403/316 |
| 5,645,365 | 7/1997 | Malish et al. ................. 403/348 |

Primary Examiner—Daniel P. Stodola
Assistant Examiner—Bruce A. Lev
Attorney, Agent, or Firm—David R. Price; James Earl Lowe, Jr.

[57] ABSTRACT

Apparatus comprising a first member including first and second member engagement surfaces, a second member, a pin pivotally connecting the first and second members, the pin having a longitudinal axis and opposite ends, and a retainer for retaining the pin in position relative to the first and second members, the retainer having a center of gravity and including first and second retainer engagement surfaces, the retainer being movable relative to the first member between a retaining position and a non-retaining position so that, when the retainer is in the retaining position, the first and second member engagement surfaces respectively engage the first and second retainer engagement surfaces to limit axial movement of the retainer relative to the first member, the retainer covers one end of the pin and thereby limits axial movement of the pin relative to the first member, the retainer has a point of engagement with the first member, and the position of the center of gravity relative to the point of engagement is such that gravity biases the retainer in a direction so that the retainer remains substantially in the retaining position, whereby the retainer is held in the retaining position without welds or other locking mechanisms, and so that, when the retainer is in the non-retaining position, the first and second member surfaces are out of engagement with the first and second retainer surfaces such that the retainer is removable from the first member.

20 Claims, 5 Drawing Sheets

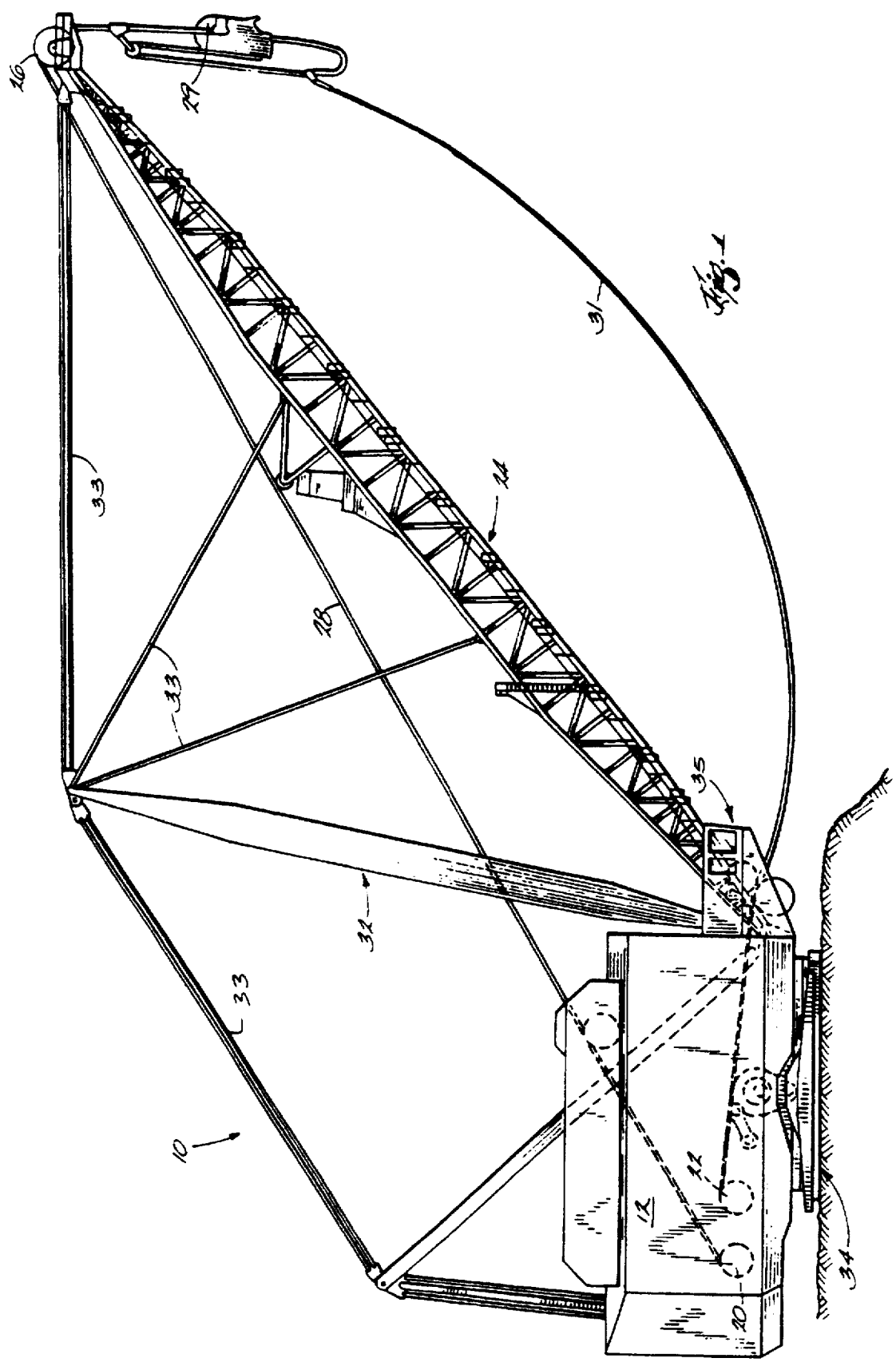

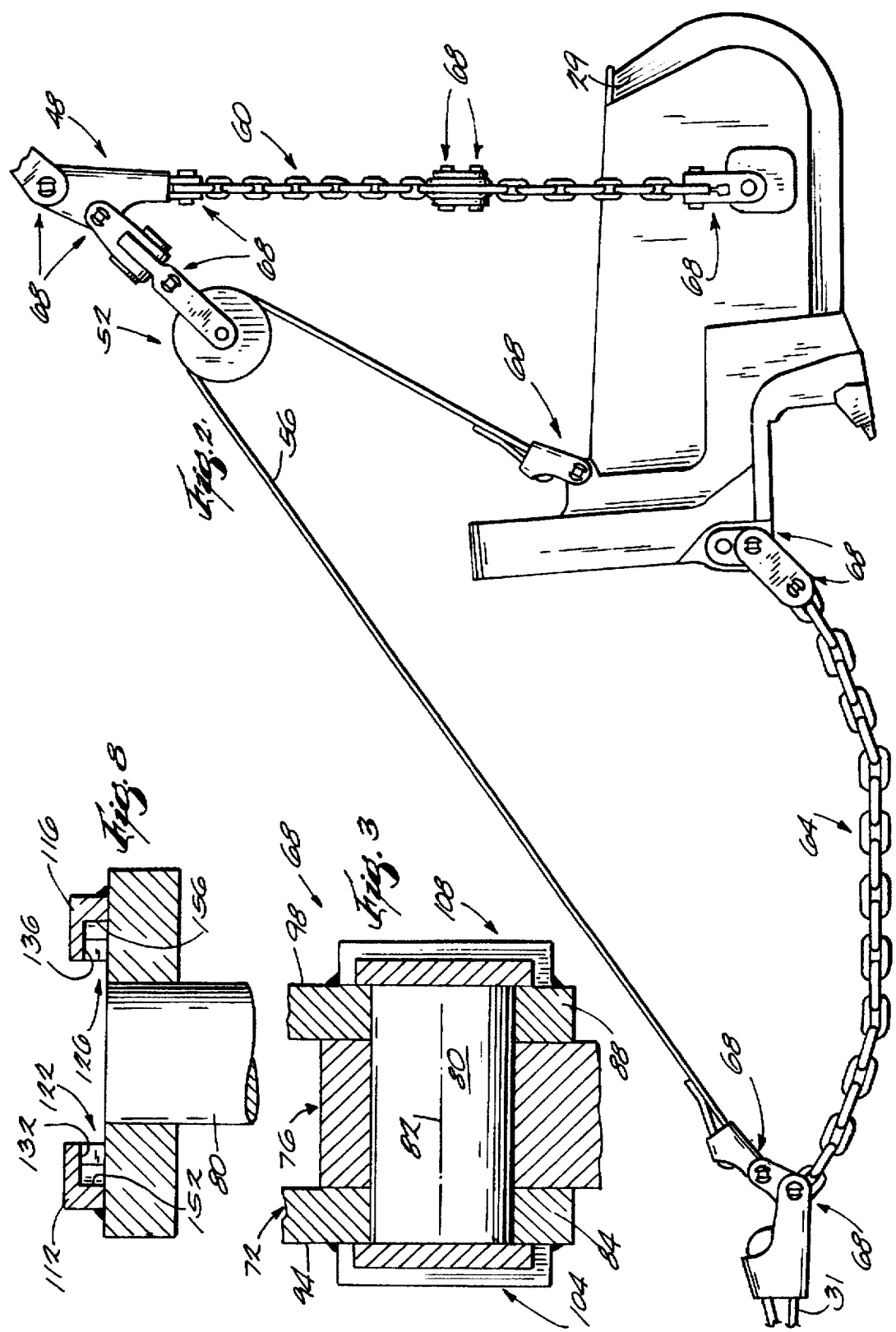

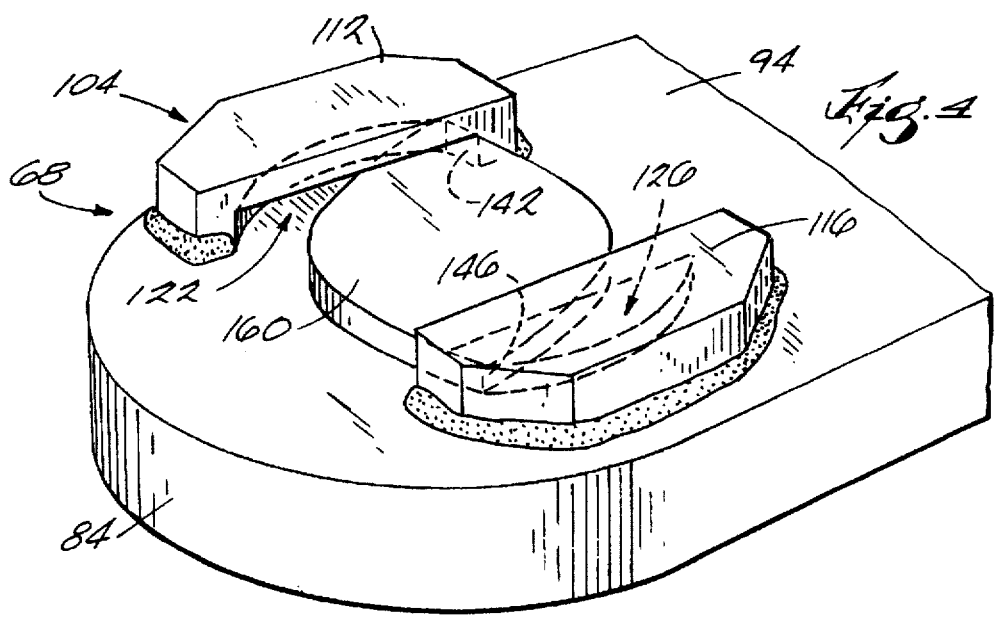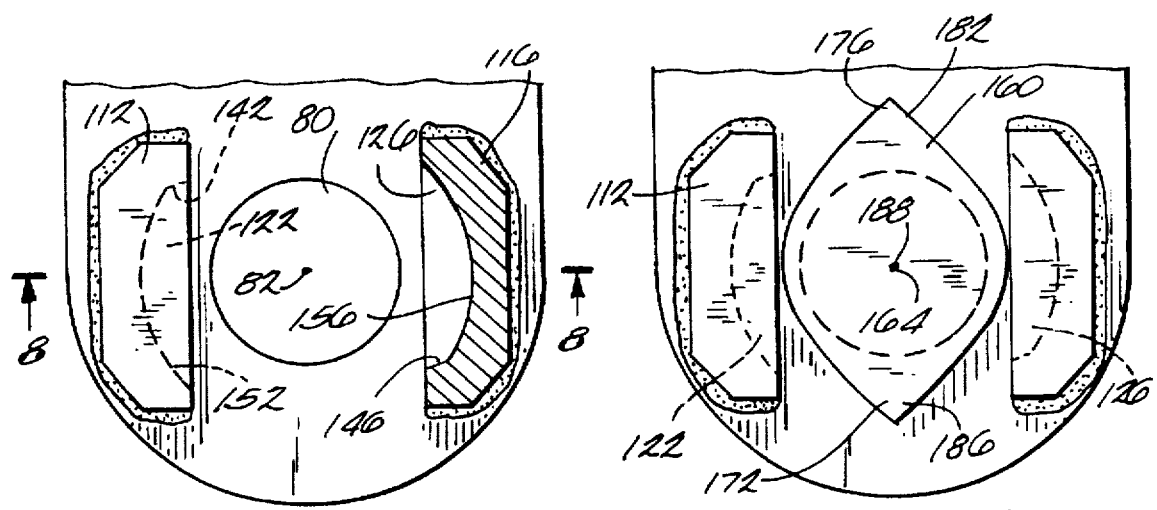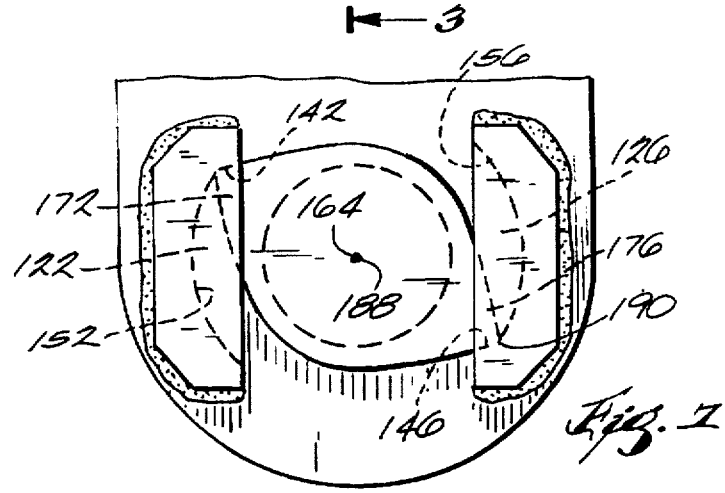

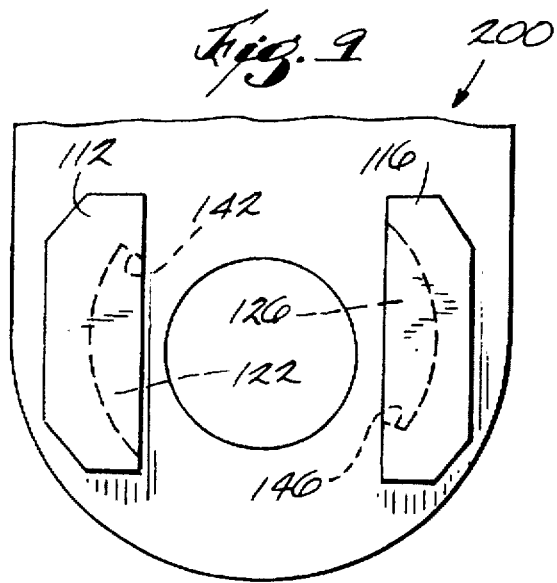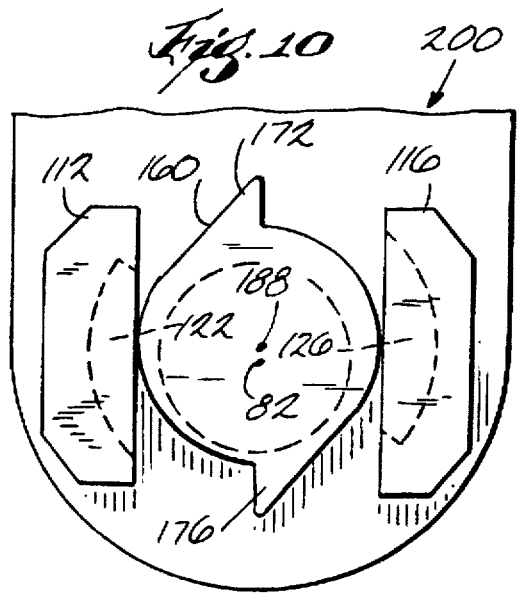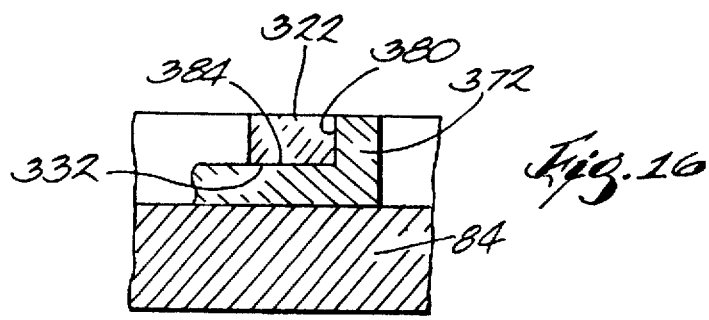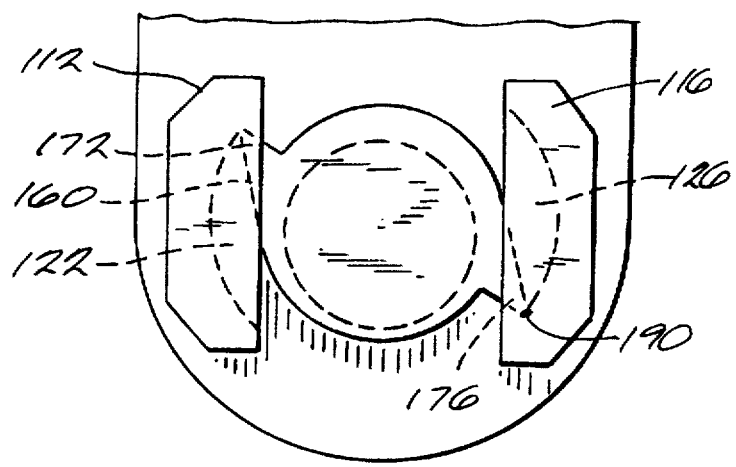

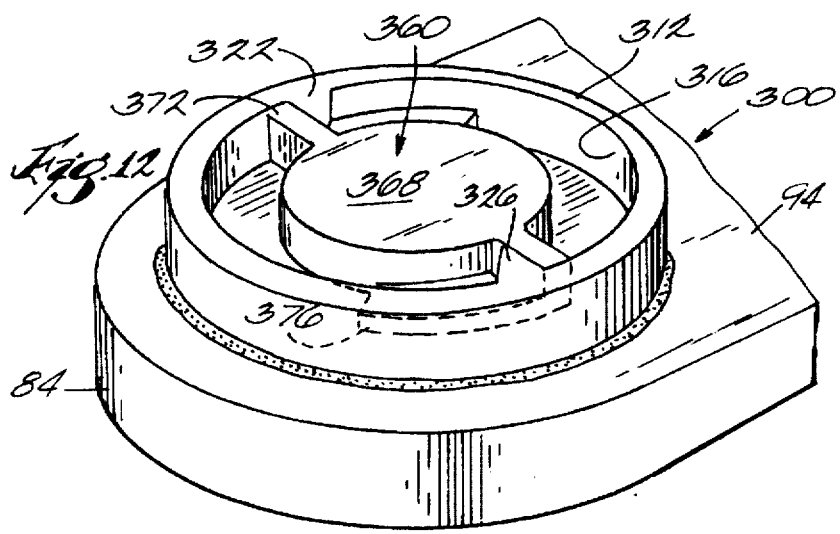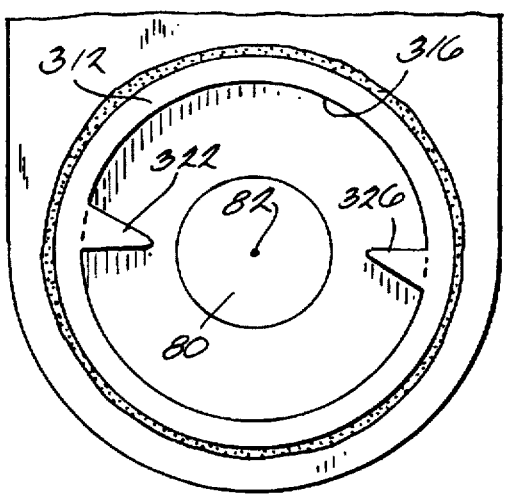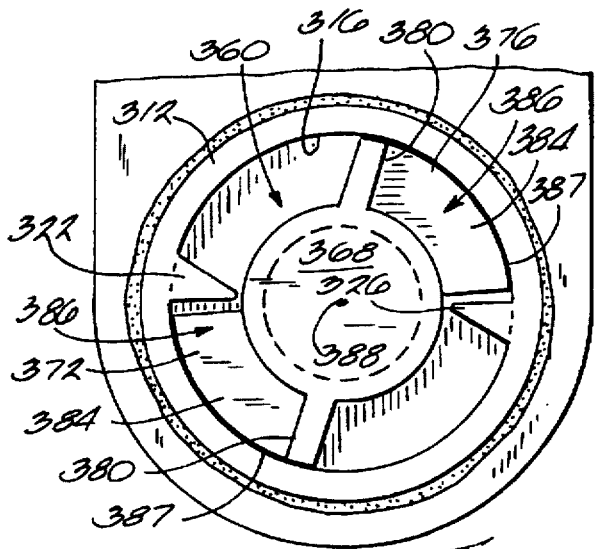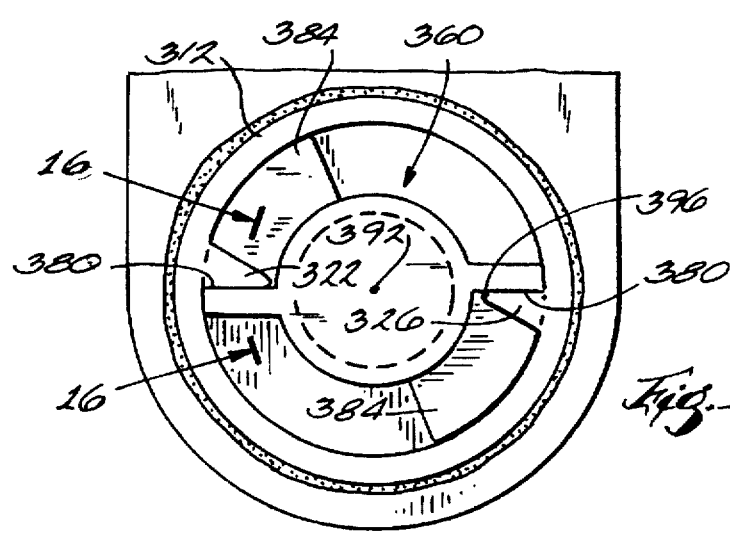

1

DRAGLINE WITH IMPROVED PIN-RETAINING STRUCTURE

BACKGROUND OF THE INVENTION

The invention relates to draglines and to structure for retaining a pin that pivotally connects two members. A dragline typically includes a main housing movable over the ground, and a boom which extends upwardly and outwardly from the main housing. The upper end of the boom has thereon a sheave mounted for rotation about a horizontal axis. A drag rope extends from a bucket drag mechanism to a bucket for causing horizontal movement of the bucket relative to the boom. A hoist rope extends from a bucket hoist mechanism and over the sheave to the bucket for causing vertical movement of the bucket. More particularly, an upper rigging is connected to the end of the hoist rope, a dump block is connected to the upper rigging, and a dump rope extends over the dump block sheave and has one end connected to the drag rope and an opposite end connected to the bucket. Also, a hoist rigging connects the upper rigging and thus the hoist rope to the bucket, and a drag rigging connects the drag rope to the bucket. The bucket, dump rope and riggings include many pivotal connections in which one member is connected to another by a pin.

Various arrangements have been used to hold such a pin in position. U.S. Pat. No. 5,577,858, which issued Nov. 26, 1996, which is assigned to the assignee hereof, and which is incorporated herein by reference, describes several such arrangements. Among other things, U.S. Pat. No. 5,577,858 discloses a weldfree retainer for a pin.

SUMMARY OF THE INVENTION

The invention provides an improved pin retainer. The retainer is held in place primarily by its own shape and requires no welding, fasteners or pins to hold it in place. The retainer requires no special tools and is inexpensive and easy to install and remove.

More particularly, the invention provides apparatus comprising a first member, a second member, and a pin pivotally connecting the first and second members. The first member includes first and second member engagement surfaces, and the pin has a longitudinal axis and opposite ends. The apparatus also comprises a retainer for retaining the pin in position relative to the first and second members. The retainer has a center of gravity and includes first and second retainer engagement surfaces. The retainer is movable relative to the first member between a retaining position and a non-retaining position. When the retainer is in the retaining position: (1) the first and second member engagement surfaces respectively engage the first and second retainer engagement surfaces to limit axial movement of the retainer relative to the first member; (2) the retainer covers one end of the pin and thereby limits axial movement of the pin relative to the first member; (3) the retainer has a point of engagement with the first member; and (4) the position of the center of gravity relative to the point of engagement is such that gravity biases the retainer in a direction so that the retainer remains substantially in the retaining position, whereby the retainer is held in the retaining position without welds or other locking means. When the retainer is in the non-retaining position, the first and second member surfaces are out of engagement with the first and second retainer surfaces such that the retainer is removable from the first member.

In the preferred embodiment of the invention, the first member has thereon one or more retaining members defining the first and second member engagement surfaces. The first and second retaining members can either be integral with the first member or separate members welded or otherwise attached to the first member.

Also, in the preferred embodiment of the invention, the retainer is rotated between the retaining and non-retaining positions, the retaining members include first and second arcuate pockets respectively including the first and second member engagement surfaces, and the retainer includes first and second projections which respectively include the first and second retainer engagement surfaces and which move into the first and second pockets, respectively, in response to rotation of the retainer from the non-retaining position to the retaining position.

In an alternative embodiment of the invention, the retainer includes first and second arcuate pockets respectively including the first and second retainer engagement surfaces, and the first member includes first and second projections which respectively include the first and second member engagement surfaces and which move into the first and second pockets, respectively, in response to rotation of the retainer from the non-retaining position to the retaining position.

Other features and advantages of the invention will become apparent to those skilled in the art upon review of the following detailed description, claims and drawings.

DESCRIPTION OF THE DRAWINGS

FIG. 1 is a side elevational view of a dragline embodying the invention.

FIG. 2 is an enlarged elevational view of the bucket and associated rigging.

FIG. 3 is a sectional view of a pivotal connection embodying the invention.

FIG. 4 is a perspective view of a portion of the connection shown in FIG. 3.

FIG. 5 is an elevational view of the connection partially broken away and with the retainer removed.

FIG. 6 is a view similar to FIG. 5 with the retainer in the non-retaining position.

FIG. 7 is a view similar to FIG. 6 with the retainer in the retaining position.

FIG. 8 is a view taken along line 8—8 in FIG. 5.

FIG. 9 is an elevational view similar to FIG. 5 of a connection that is an alternative embodiment of the invention and with the retainer removed.

FIG. 10 is a view similar to FIG. 9 with the retainer in the non-retaining position.

FIG. 11 is a view similar to FIG. 10 with the retainer in the retaining position.

FIG. 12 is a perspective view of a connection that is a second alternative embodiment of the invention.

FIG. 13 is an elevational of the connection shown in FIG. 12 with the retainer removed.

FIG. 14 is a view similar to FIG. 13 with the retainer in the non-retaining position.

FIG. 15 is a view similar to FIG. 14 with the retainer in the retaining position.

FIG. 16 is a view taken along line 16—16 in FIG. 15.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A walking dragline 10 embodying the invention is illustrated in the drawings. The dragline 10 comprises (see FIG. 1) a main housing 12. A bucket hoist mechanism 20 and a bucket drag mechanism 22 are mounted on the main housing 12. A boom 24 extends upwardly and outwardly from the main housing 12. The upper end of the boom 24 has thereon a sheave 26 which is rotatable about a horizontal axis. A hoist rope 28 extends from the bucket hoist mechanism 20 over the sheave 26 to a bucket 29 for causing vertical movement of the bucket 29 relative to the boom 24. A drag rope 31 extends from the bucket drag mechanism 22 to the bucket 29 for causing horizontal movement of the bucket 29. The manner in which the hoist and drag ropes 28 and 31 are connected to the bucket 29 is described below. The boom 24 is supported relative to the main housing 12 by a conventional mast 32. Support lines 33 are connected between the upper end of the mast 32 and the boom 24 for supporting the boom 24. When the dragline 10 is digging, the main housing 12 is supported by a tub that sits on the ground and allows the machine to rotate. A pair of walking mechanisms 34 (one shown) move the main housing 12 over the ground between digging operations. The main housing 12 includes an operator's cab 35.

As best shown in FIG. 2, the end of the hoist rope 28 is connected to upper rigging 48 which is in turn connected to one or more dump blocks 52. A dump rope 56 extends over the dump block 52 and has one end connected to the drag rope 31 and an opposite end connected to the bucket 29. A hoist rigging 60 connects the upper rigging 48 to the bucket 29, and a drag rigging 64 connects the drag rope 31 to the bucket 29. Each of the riggings 60 and 64 includes a plurality of chain links. Various connections (identified by reference numeral 68) between the riggings 48, 60 and 64, the dump block 52, the dump rope 56, the hoist rope 28, the drag rope 31, and the bucket 29 include a pin pivotally connecting two members. The dragline 10 as thus far described is conventional.

One pivotal connection 68 is illustrated in greater detail in FIGS. 3 through 8. The connection 68 includes a first member or clevis 72 pivotally connected to a second member or link 76 by a pin 80. The pin has a longitudinal axis 82 and opposite ends. The pin 80 extends through the link 76 and through holes or eyes in spaced legs 84 and 88 of the clevis. The legs 84 and 88 have respective outer surfaces 94 and 98. This is conventional.

The connection also includes, on the outer surfaces 94 and 98, respective retainer assemblies 104 and 108 limiting axial movement of the pin 80 and thereby maintaining the pivotal connection of the members 72 and 76. The retainer assemblies 104 and 108 are substantially identical, and only the assembly 104 will be described in detail.

The retainer assembly 104 is illustrated in greater detail in FIGS. 4 through 8. The assembly 104 includes, on the outer surface 94 of the clevis leg 84, retaining members 112 and 116 on opposite sides of the pin 80. In the illustrated construction, the retaining members 112 and 116 are welded to the clevis leg 84. In alternative embodiments of the invention the retaining members could be integral with the leg 84. For example, the members 112 and 116 and the leg 84 could be a single casting. The members 112 and 116 define respective arcuate pockets 122 and 126 respectively having, or being defined at least in part by, first and second member engagement surfaces 132 and 136 (best shown in FIG. 8), first and second stop surfaces 142 and 146 (FIG. 5), and first and second walls 152 and 156 that define a cylinder centered on the pin axis 82. In other words, the walls 152 and 156 are centered on the pin axis 82.

The retainer assembly 104 also includes (see FIGS. 4 and 6) a retainer 160. The retainer 160 has a center of gravity 164 (FIG. 6) and includes a central portion and first and second pointed projections 172 and 176 which extend radially outward from the central portion and which define first and second retainer engagement surfaces 182 and 186. The retainer 160 is rotatable relative to the leg 84 and about an axis of rotation 188 between a retaining position (FIGS. 4 and 7) and a non-retaining position (FIG. 6). In the illustrated construction, the axis of rotation 188 is coincident with the pin axis 82 and extends through the center of gravity 164.

When the retainer is in the retaining position (FIG. 7), the projections 172 and 176 respectively extend into the pockets 122 and 126, and the member engagement surfaces 132 and 136 respectively engage the projections 172 and 176 (and the retainer engagement surfaces 182 and 186) to limit axial movement of the retainer 160 relative to the leg 84. Because the retainer 160 covers the end of the pin 80 when the retainer is in the retaining position, the retainer 160 limits axial movement of the pin 80 relative to the leg 84. Also, when the retainer 160 is in the retaining position, the stop surfaces 142 and 146 respectively engage the projections 172 and 176 to prevent rotation of the retainer 160 beyond the retaining position. Also, when the retainer 160 is in the retaining position, the retainer 160 has a point of engagement 190 (FIG. 7) with one of the retaining members 112 and 116, and the position of the center of gravity 164 relative to the point of engagement 190 is such that gravity biases the retainer 160 in a direction so that the retainer remains substantially in the retaining position, whereby the retainer is held in the retaining position without welds or other locking means. More particularly, the point of engagement 190 is the outer end of the lowermost of the projections 172 and 176 (the projection 176 in FIG. 7). The location of the center of gravity 164 relative to the point of engagement 190 causes the retainer to want to pivot (counter-clockwise in FIG. 7) about the point of engagement 190. The retainer 160 cannot do so, however, because the pocket wall 152 is centered on the retainer axis of rotation 188 (the pin axis 82), and the pocket wall 152 thus interferes with rotation of the retainer 160 about the point of engagement 190. If the entire connection 68 is turned upside down, or is simply rotated far enough so that the end of the projection 172 is below the end of the projection 176, the point of engagement becomes the end of the projection 172, and the pocket wall 156 interferes with rotation of the retainer 160. In either case, gravity biases the retainer 160 in a direction so that the retainer remains substantially in the retaining position, so that the retainer 160 is held in the retaining position without welds or other locking means.

When the retainer 160 is in the non-retaining position, the projections 172 and 176 are out of the pockets 122 and 126 and out of engagement with the member engagement surfaces 132 and 136 such that the retainer 160 is removable from the leg 84.

A connection 200 that is an alternative embodiment of the invention is illustrated in FIGS. 9–11. Except as described below, the connection 200 is substantially identical to the connection 68, and common elements have been given the same reference numerals.

The connection 200 differs from the connection 68 primarily in that the retaining members 112 and 116 are integral with the leg 94 (e.g., the leg 94 and the members 112 and 116 are a single casting), in that the retainer 160 has a different shape and in that the retainer axis of rotation 188 is offset from the pin axis 82. The difference in the shape of the retainer 160 is evident from viewing FIGS. 10 and 11. Obviously, many different retainer shapes are within the scope of the invention. The retainer axis of rotation 188 is offset from the pin axis 82 so that rotation of the pin 80 about its axis 82 cannot cause rotation of the retainer 160 about its axis 188 and thereby accidentally rotate the retainer 160 from the retaining position to the non-retaining position. (This undesirable result is conceivable with the construction shown in FIGS. 3-8.)

A connection 300 that is another alternative embodiment of the invention is illustrated in FIGS. 12-16. Again, common elements have been given the same reference numerals.

In the connection 300, the retaining members 112 and 116 are replaced by a single annular retaining member 312 having a cylindrical inner wall 316 defining a cylindrical recess. The retaining member 312 has thereon first and second generally diametrically opposed, radially inwardly extending pointed projections 322 and 326. The projections 322 and 326 are spaced above the leg surface 94 such that the undersides of the projections 322 and 326 define respective engagement surfaces 332. The engagement surface 332 of the projection 322 is illustrated in FIG. 16. The engagement surface of the projection 326 is not shown, but is identical to the engagement surface of the projection 322. The retaining member 312 is centered on the pin axis 82.

Also, in the connection 300, the retainer 160 is replaced by a retainer 360. The retainer 360 includes a generally circular central portion 368 and a pair of radially outwardly projecting portions 372 and 376. Each of the projecting portions 372 and 376 is L-shaped in cross-section (see FIGS. 12 and 16) and includes (see FIG. 14) a stop surface 380 and an engagement surface 384 perpendicular to the stop surface 380. The stop surface 380 and the engagement surface 384 partially define an arcuate pocket 386. Each of the projecting portions 372 and 376 also has an outer surface 387 defining a cylinder having a diameter just slightly less than the inside diameter of the retaining member inner wall 316, so that the retainer 360 fits snugly inside the retaining member 312, as shown in FIG. 14. The retainer 360 also has an axis of rotation 388 (FIG. 14) and a center of gravity 392 (FIG. 15) located on the axis of rotation 388. The retainer 360 is placed in the recess defined by the retaining member 312 and is rotatable relative to the leg 84 between a retaining position (FIG. 15) and a non-retaining position (FIG. 14).

When the retainer 360 is in the retaining position, the projections 322 and 326 extend into the respective pockets 386, the member engagement surfaces 332 (the undersides of the projections 322 and 326) engage the respective retainer engagement surfaces 384 to limit axial movement of the retainer relative to the leg 84, and the retainer 360 thus limits axial movement of the pin 80 relative to the leg 84. Also, when the retainer is in the retaining position, the stop surfaces 380 engage the respective projections 322 and 326 to prevent rotation of the retainer beyond the retaining position. Also, when the retainer is in the retaining position, the retainer 360 has a point of engagement 396 (FIG. 15) with one of the projections 322 and 326, and the position of the center of gravity 392 relative to the point of engagement 396 is such that gravity biases the retainer 360 in a direction so that the retainer remains substantially in the retaining position, whereby the retainer is held in the retaining position without welds or other locking means. More particularly, the point of engagement 396 is the outer end of one of the projections 322 and 326. The location of the center of gravity 392 relative to the point of engagement 396 causes the retainer to want to pivot (counter-clockwise in FIG. 15) about the point of engagement 396. The retainer cannot do so, however, because the inner wall 316 of the retaining member 312 is centered on the retainer axis of rotation 388, and the inner wall 316 engages the retainer outer surface 387 opposite the point of engagement 396 and thus interferes with rotation of the retainer about the point of engagement.

Various features of the invention are set forth in the following claims.

I claim:

1. Apparatus comprising:
    a first member including first and second member engagement surfaces,
    a second member,
    a pin pivotally connecting the first and second members, the pin having a longitudinal axis and opposite ends, and
    a retainer for retaining the pin in position relative to the first and second members, the retainer having a center of gravity and including first and second retainer engagement surfaces, the retainer being movable relative to the first member between a retaining position and a non-retaining position so that, when the retainer is in the retaining position, the first and second member engagement surfaces respectively engage the first and second retainer engagement surfaces to limit movement of the retainer away from the first member, the retainer covers one end of the pin and thereby limits axial movement of the pin relative to the first member, the retainer has a point of engagement with the first member at a rotation stop surface formed on the member engagement surfaces of the first member and the position of the center of gravity relative to the point of engagement is such that gravity biases the retainer in a direction so that the retainer remains substantially in the retaining position, whereby the retainer is held in the retaining position without welds or other locking means, and so that, when the retainer is in the non-retaining position, the first and second member surfaces are out of engagement with the first and second retainer surfaces such that the retainer is removable from the first member.

2. Apparatus as set forth in claim 1 wherein the first member has thereon one or more retaining members defining the first and second member engagement surfaces.

3. Apparatus as set forth in claim 1 wherein the first and second member engagement surfaces are integral with the first member.

4. Apparatus as set forth in claim 1 wherein the retainer is rotated between the retaining and non-retaining positions.

5. Apparatus as set forth in claim 4 wherein the first member includes first and second arcuate pockets respectively including the first and second member engagement surfaces, and wherein the retainer includes first and second projections which respectively include the first and second retainer engagement surfaces and which move into the first and second pockets, respectively, in response to rotation of the retainer from the non-retaining position to the retaining position.

6. Apparatus as set forth in claim 5 wherein the retainer has an axis of rotation, and wherein the first and second arcuate pockets are respectively defined in part by first and second walls defining a cylinder centered on the retainer axis of rotation.

7. Apparatus as set forth in claim 5 wherein the projections extend radially outward.

8. Apparatus as set forth in claim 5 wherein the first member includes stop surfaces preventing rotation of the retainer beyond the retaining position.

9. Apparatus as set forth in claim 4 wherein the retainer includes first and second arcuate pockets respectively including the first and second retainer engagement surfaces, and wherein the first member includes first and second projections which respectively include the first and second member engagement surfaces and which move into the first and second pockets, respectively, in response to rotation of the retainer from the non-retaining position to the retaining position.

10. Apparatus as set forth in claim 9 wherein the projections extend radially inward.

11. Apparatus as set forth in claim 9 wherein the retainer includes stop surfaces preventing rotation of the retainer beyond the retaining position.

12. Apparatus as set forth in claim 1 wherein at least one of the retainer and the first member includes a pointed projection defining the point of engagement.

13. Apparatus as set forth in claim 12 wherein the one of the retainer and the first member includes two or more pointed projections.

14. Apparatus as set forth in claim 1 wherein the center of gravity of the retainer is offset from the retainer axis.

15. Apparatus as set forth in claim 1 wherein the first member includes first and second pockets respectively including the first and second member engagement surfaces, and wherein the retainer includes first and second projections which respectively include the first and second retainer engagement surfaces and which move into the first and second pockets, respectively, in response to movement of the retainer from the non-retaining position to the retaining position.

16. Apparatus as set forth in claim 15 wherein the first member includes stop surfaces preventing movement of the retainer beyond the retaining position.

17. Apparatus as set forth in claim 1 wherein the retainer includes first and second pockets respectively including the first and second retainer engagement surfaces, and wherein the first member includes first and second projections which respectively include the first and second member engagement surfaces and which move into the first and second pockets, respectively, in response to movement of the retainer from the non-retaining position to the retaining position.

18. Apparatus as set forth in claim 17 wherein the retainer includes stop surfaces preventing movement of the retainer beyond the retaining position.

19. Apparatus as set forth in claim 1 wherein the longitudinal axis of the pin extends generally horizontally.

20. Apparatus as set forth in claim 1 and further comprising a dragline bucket and a rigging and cable assembly for operably connecting the bucket to a dragline machine, and wherein at least one of the bucket and the rigging and cable assembly includes the first member, the second member, the pin, and the retainer.

* * * * *